Dec. 17, 1940.    C. R. NEESON    2,225,228
COMPRESSOR LUBRICATION
Filed May 29, 1937    2 Sheets-Sheet 2
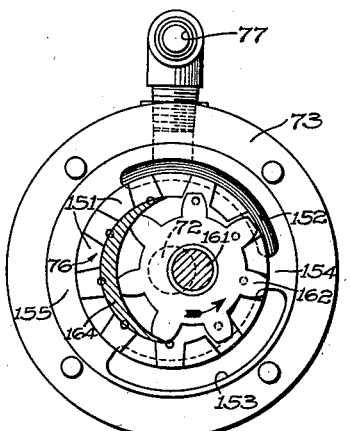
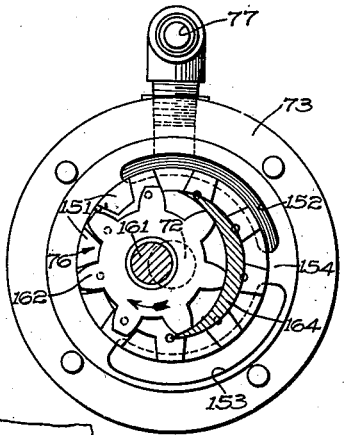
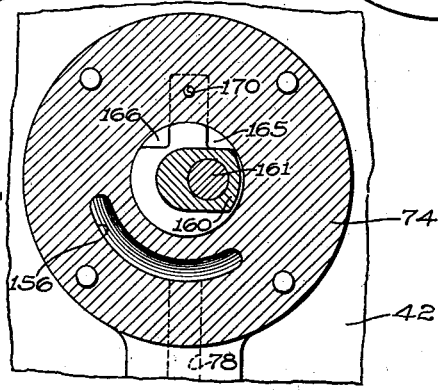
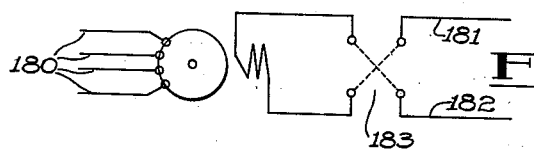
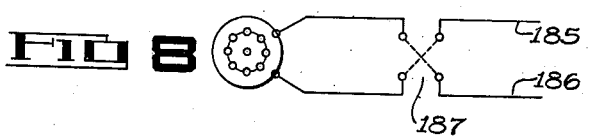
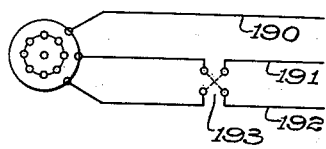
INVENTOR
CHARLES R. NEESON
BY
ATTORNEY

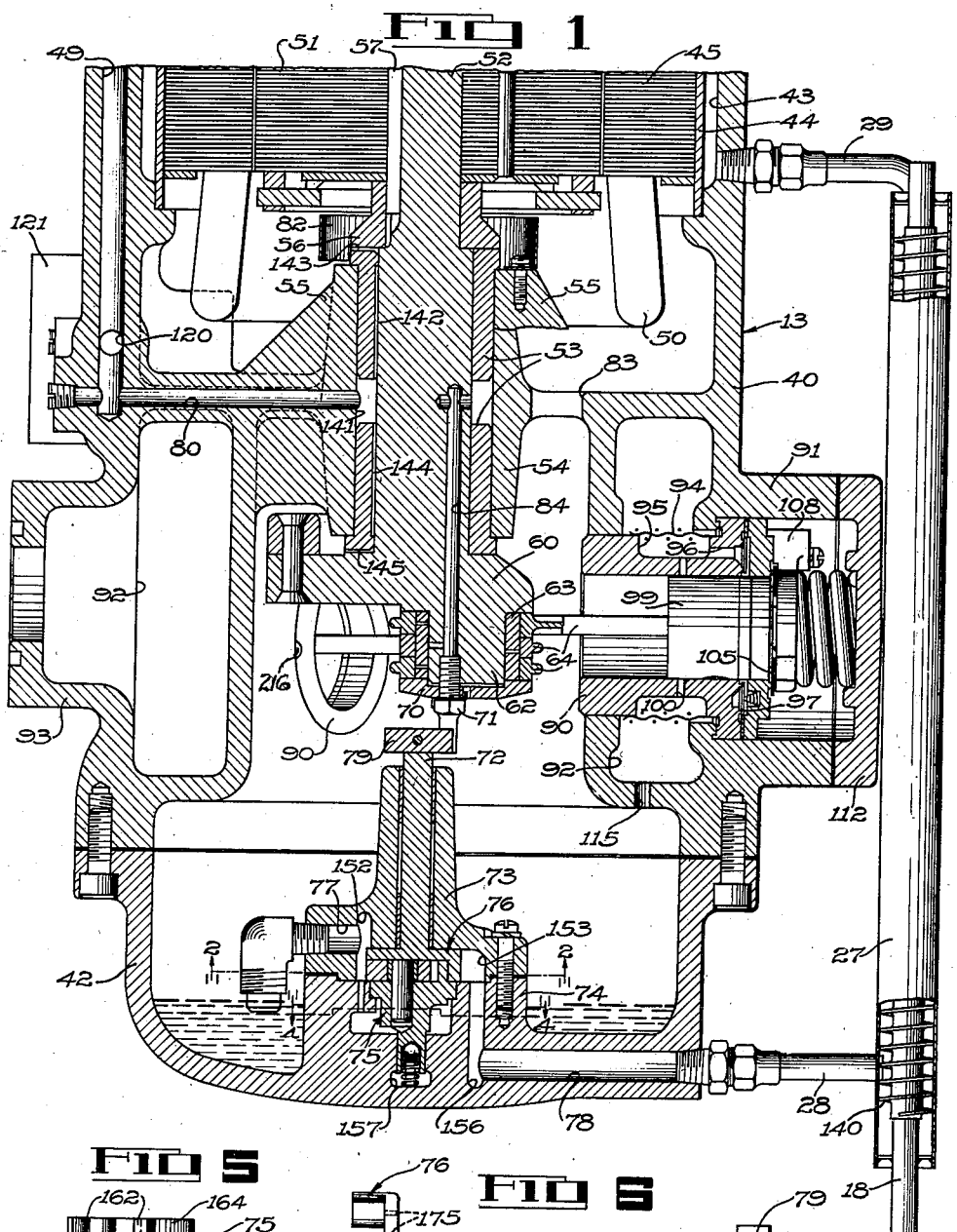

UNITED STATES PATENT OFFICE 2,225,228

COMPRESSOR LUBRICATION

Charles R. Neeson, Dayton, Ohio, assignor, by mesne assignments, to Chrysler Corporation, Highland Park, Mich., a corporation of Delaware Application May 29, 1937, Serial No. 145,586

1 Claim. (Cl. 230—206)

The present invention relates to apparatus for lubricating and cooling a compressing unit for use in a refrigerating system such as is used in refrigerators and air conditioners. The principal object of the present invention is to devise oil pumping means which operates regardless of the direction of rotation of the shaft of the compressor in which it is incorporated.

The invention is of particular utility in the combination of a hermetically sealed motor and compressor assembly of the type in which the motor is fastened to a main shaft having a crank at one end thereof to which the pistons are attached. In such an assembly the type of motor may vary in characteristics in accordance with local power conditions. For example, the motor may be a three-phase, squirrel cage induction motor or a single-phase squirrel cage induction motor, or a two-phase synchronous motor, or almost any other standard type. The current supplied by power companies varies in different localities. For example, there are power systems supplying current at 50, 60, 110, 208, 220, and 440 volts and the current may be direct, or alternating at 50 or 60 cycles. Accordingly, in order to supply the demand for refrigerating machinery in all sections of the country it is necessary to supply compressing units embodying any one of fifty or sixty different types of motors. Included among these different types of motors are a number which rotate clockwise or counter-clockwise according to the manner in which the power lines are attached to the motor, and the present invention has for its object the provision of a compressing unit which may operate regardless of the direction of rotation of the motor embodied therein.

The principal object of the invention is to provide a compressing unit, consisting of a motor and compressor assembly in combination with an oil pump and lubricating system in which the oil will always flow in one direction through the compressing unit regardless of the direction of rotation of the motor. This is desirable for several reasons; one reason being that the installer of the refrigerating machinery may not always attach the power lines to the compressor in such a manner that the motor would rotate in a desired direction, and the most important reason being that, even though the connections were properly made, the power company or a linesman for the power company might unwittingly reverse the wires and cause the motor to run in the opposite direction. In either case, the compressing unit might operate satisfactorily for a short period of time due to its inherent characteristics if the compressor is of the radial type designed to operate regardless of the direction of rotation of the motor. However, after a short period of time an ordinary lubricating system would have caused all the oil to drain from the motor and compressor with resulting friction which would cause either the motor or the compressor to fail and would possibly cause them to be ruined. Accordingly, the principal object of the present invention is to devise an oil pump in combination with a compressor which operates regardless of the direction of rotation of the motor driving the compressor.

The objects and advantages of the present invention will be fully apparent from the following description taken in connection with the accompanying drawings wherein like numerals refer to like parts throughout.

In the drawings:

Figure 1 discloses the essential elements of the preferred form of compressing unit embodied in the present invention, the figure being taken as a vertical, central cross-section of a compressing unit such as more fully disclosed in my copending application, Serial No. 145,585, filed concurrently herewith, now Patent No. 2,204,510, issued June 11, 1940, to which reference may be made for more complete details of the compressing unit and its application to a refrigerating machine, the present disclosure being sufficient for an understanding of the present invention;

Figure 2 is a horizontal cross-section taken along line 2—2 of Figure 1 and illustrating the operation of the oil pump when the motor is rotating in one direction;

Figure 3 is a view similar to Figure 2 showing the operation of the pump when the motor is rotating in the opposite direction;

Figure 4 is a horizontal cross section taken on line 4—4 of Figure 1, showing further details of the pump;

Figure 5 is a detail view of a portion of the preferred form of oil pump;

Figure 6 is a detail view of another part of the pump;

Figure 7 is a schematic wiring diagram illustrating the possibility of accidentally or intentionally reversing the direction of rotation of the motor when the motor is of the synchronous, two-phase type;

Figure 8 is a schematic wiring diagram illustrating the possibility of accidentally or intentionally reversing the direction of rotation of the motor when the motor is of the single-phase induction type; and Figure 9 is a similar wiring diagram in which the motor is of the 3-phase, squirrel cage induction type.

The compressing unit is preferably hermetically sealed within a casing 13 comprising a substantially cylindrical shell 40, a top cover (not shown), and an oil sump 42 forming a detachable bottom cover for the casing. The shell is provided with a recess 43 and a ring 44 is fitted within the shell to form a passage for the oil which is caused to circulate through recess 43 in order to cool an electric motor, the stator 45 of which is fitted against ring 44. The oil enters through an oil return pipe 29 extending through the shell at the bottom of recess 43 and leaves through an opening communicating with bore 49 extending downward through the shell wall, the opening (not shown) being located at the top of the recess in order that oil will completely surround the stator of the motor. The motor is more fully illustrated in my copending application, mentioned above.

The rotor 51 is attached to a crankshaft 52 by a key 57 and fastening means (not shown). The rotor is supported by a collar 56 resting upon the upper end of one of a pair of bearings 53 supported in a housing 54 carried by radiating arms 55 integral with the shell. The shaft 52 is provided with an enlarged head 60 bearing against the end of lower bearing 53, the head being provided with an offset crank 62. A bearing 63 surrounds the crank and is in turn surrounded by the bearing straps of piston rods 64. The bearing 63 and piston rods 64 are maintained on the crank by a cap 70 and an extended locking pin 71.

The pin 71 is eccentrically positioned with respect to the axis of shaft 52 and acts as the driver for a pump rotor shaft 72 which is concentric with the axis of shaft 52. The pump rotor shaft is held in bearings in a pump head 73 attached to a pump housing 74 integral with the oil sump 42. The pump is preferably of the interlocked gear type comprising an idler gear and crescent assembly 75 and a rotor gear 76; the rotor gear being integral with the pump rotor shaft 72. The rotor gear is continuously driven by pin 71 engaging one arm of a cross-bar 79 extending laterally from both sides of the rotor shaft 72, so that if the motor starts in one direction pin 71 will engage one end of bar 79 and will continuously rotate rotor gear 76 in the same direction as that of rotor 51, and if the direction of rotation of rotor 51 reverses, pin 71 will describe an arc of approximately 180 degrees without affecting the pump until it engages the opposite end of bar 79 whereupon the rotor gear will be continuously rotated in the new direction of rotation.

Regardless of the direction of rotation the pump is designed, as will be presently explained, to suck oil from the oil sump 42 through a suction inlet 77 and to discharge the oil through an outlet 78 communicating with an oil discharge pipe 28. The pipe 28 leads the oil to the interior of an oil cooler tube 27. The oil cooler may be of any desired type, the instant illustration being of a water-cooled type. The water-cooled oil cooler preferably comprises the closed tube 27 which is provided with a concentric internal tube 18 of smaller diameter through which water is passed at the temperature and rate of flow necessary to reduce the temperature of the oil heated by the motor and compressor to the temperature necessary to keep the motor and compressor at a safe temperature. The water preferably enters at the top of tube 18 and therefore flows in the opposite direction to the oil which enters at the bottom of tube 27. Advantage is therefore taken of the counter-flow principle of heat transfer, the warmest oil being in heat-transferring relation to water which has been previously warmed by extracting heat from the coolest oil. In order that the oil cooler may be as effective a heat-transfer device as possible without occupying a large space the tube 18 is preferably provided with a spirally positioned fin 140, the outer edges of which closely embrace the internal wall of tube 27. The oil therefore flows upward in a spiral path of great length, the fin not only forming the passage for the oil but providing a large surface area for the transference of heat.

The cool oil passes from the heat transfer device through tube 29 into recess 43 as previously described. After cooling the motor the oil enters bore 49 which communicates with a bore 80 passing through one of the supporting arms 55. The bore 80 leads to an annular space 141 defined by shaft 52, the inner ends of bearings 53, and the housing 54. Oil may escape from the annular space by passing between the surfaces of bearing 53 and shaft 52, axially extending grooves 142 being provided to assist in distributing a thin film of oil throughout the bearing surfaces. The oil which flows upwardly may escape from between the end of upper bearing 53 and collar 56, grooves 143 being provided to aid its passage. The shaft, rotating at high speed, would whip the oil against the windings 50 of the stator 45 were it not for a splash ring 82 supported by the arms 55. The oil upon striking the splash ring collects into drops which pass into the oil sump 42 by way of openings 83 between the supporting arms 55. Oil which passes downwardly between lower bearing 53 and shaft 52 may escape from between the end of lower bearing 53 and the enlarged head 60, grooves 144 and 145, corresponding to grooves 142 and 143, respectively, being provided in the bearing surface to distribute the oil in its passage.

A bore 84 extending longitudinally of shaft 52 communicates with space 141 at one end and with the inner surface of bearing 63 at its other end. Oil is thereby caused to lubricate the surface of crank 62 and is permitted to flow outwardly from between the upper end of bearing 63 and head 60, and from between the lower end of bearing 63 and cap 70. A number of small openings are provided in bearing 63 to permit oil to flow outwardly therethrough to lubricate the surfaces of the bearing straps of piston rods 64, the oil thereafter escaping from between the adjacent surfaces of the bearing straps and the head 60 and cap 70. The oil which so emerges is whipped into the cylinders of the compressor and against the surface of the casing between the cylinders. Most of this oil drips into the oil sump, while a small portion thereof, after lubricating the piston and cylinder walls and the suction and discharge valves of the compressor, may be entrained with the compressed refrigerating gas and eventually returned to the compressing unit after passing through some or all of the refrigerating equipment.

The pistons 99 operate in cylinder liners 90 inserted through discharge heads 91 cast integrally with the shell 40, the liners extending through an integrally cast suction manifold 92 communicating with the refrigerating equipment by way of a suction head 93. The expanded gas, returning to compressing unit, passes into the compression space of the cylinder by way of the suction manifold 92, entering the cylinder through screen 94, annular space 95, passage 96, and auxiliary ports 100. The principal amount of gas enters by way of suction valve 97, the auxiliary ports 100 aiding in increasing the capacity of the compressor. The compressed gas is discharged by way of discharge valve 105 seated against a header 108 as more fully explained in my copending application, Serial No. 145,589, filed concurrently herewith, now Patent No. 2,137,965; issued November 22, 1938. The discharge head 91 is closed by a cap 112 defining a discharge pocket which communicates with the high pressure side of the refrigerating equipment (not shown). The screen 94 is preferably of fine mesh which tends not only to prevent foreign matter such as scale from entering the valve assembly but to separate slugs or droplets of oil from the refrigerating gas with which the oil may be entrained. The oil so separated from the gas passes through an opening 115 and drops into the oil sump 42, the opening 115 thus providing a means for removing oil from the gas and returning it to the crankcase, and for removing gas from the crankcase. Grooves 216 in the sides of cylinder liners 90 also serve to permit removal of gas from the crankcase.

In order to assure unidirectional flow of the oil and constant lubrication the pump is made automatically reversible as subsequently described. The rotor gear 76 compirses a disc 150 concentric with pump rotor shaft 72 which is provided with axially extending teeth 151 adadjacent its periphery. The disc and teeth fit within a cavity in head 73, which is provided with an elongated suction port 152 and an elongated discharge port 153, the ports being separated by fixed lands 154 and 155. Port 152 communicates with suction inlet 77 directly, while port 153 communicates with discharge outlet 78 by way of a passage 156 in pump housing 74.

The pump housing is provided with a socket 157 concentric with the axis of shaft 72 in which is positioned the locating stub 158 of the crescent and idler gear assembly 75. The stub adjoins a limiting portion 160 in which is mounted an eccentrically located idler gear shaft 161, the eccentricity thereof being such as to permit the idler gear 162 to mesh fully with teeth 151 at one point only, gear 162 being provided with a lesser number of teeth than there are teeth 151. Portion 160 adjoins a bearing section 163 which seats upon a concentric annular shelf of the housing 74, and which forms a support for the idler gear 162. The upper surface of the bearing section is level except for a crescent 164 filling the space between gear 162 and gear 76 opposite their intermeshing teeth.

When shaft 72 rotates in the direction indicated by the arrow in Figure 2, limiting portion 160 is swung by the friction between the gears so as to strike an abutment 165 on the pump housing. This places the crescent adjacent land 155 and causes the gear teeth to mesh adjacent land 154. Oil enters the spaces between gear teeth 151 from port 152, is trapped between the teeth of gear 162 and crescent 164 and forced into port 153 by the piston action of the gear teeth approaching the point of complete meshing. If shaft 72 rotates in the opposite direction as indicated by the arrow in Figure 3, limiting portion 160 swings through an arc of 180 degrees and strikes an abutment 166 on the pump housing. This causes the relative position of the crescent to reverse, but oil is still caused to enter the spaces between gear teeth 151 from port 152, to be trapped between the teeth of gear 162 and crescent 164, and to be forced into port 153.

Thus, through the loose connection at 71—79 and the reversible character of the crescent and idler assembly, the pump cannot operate until the shaft 52 has completed one full rotation, which eliminates any load upon the motor at the instant of starting.

In order to prevent binding of the parts due to excessive pressures built up by the compression of the oil in the discharge port 153 the pump housing 74 is provided with a vertical opening 170 leading to a passage between abutments 165 and 166, the passage leading to a clear space surrounding limiting portion 160 and also to the open lower end of bore 171 in which idler gear shaft 161 is mounted. The idler gear shaft is thereby lubricated and the idler and crescent assembly is caused to float in oil at equal pressures on both sides thereof. The locating stub 158 is also provided with a vertical groove 172 by means of which oil is caused to lubricate the stub and to fill the socket 157, thereby lubricating a ball 173 located in the stub and maintained therein by a spring 174, this construction providing a resilient thrust bearing tending to keep the gears in proper alignment. In order also to prevent binding of the rotor gear 76 the disc 150 is preferably provided with a series of small openings 175 permitting oil to pass to the bearing surface therefor provided by pump head 73.

The particular features of the present pump are described and claimed in the patents to Wilsey, 1,660,464, February 28, 1928; Wilsey 1,700,818, February 5, 1929; Nielsen 1,042,951, October 29, 1912; and Nielsen 751,196, February 2, 1904. It is not a part of my invention to devise such a pump, my invention being the combination of such a pump with the apparatus illustrated and previously described. Other types of automatically reversible, unidirectional pumps may be suitable for the purpose and such types of pumps when placed in the combination herein described are considered to be the equivalent of the illustrated type.

Figure 7 schematically illustrates a wiring diagram in which the motor is a two-phase, synchronous motor supplied with alternating current through the leads 180 and with direct current through the leads 181 and 182. A reversing switch 183 is indicated as a means whereby the direction of current in leads 181 and 182 may be reversed whereby to cause such a motor to rotate in the opposite direction.

Figure 8 is a schematic wiring diagram similar to Figure 7 in which the motor is a single-phase, squirrel-cage, induction motor supplied with alternating current through leads 185 and 186. A reversing switch 187 is indicated as a means whereby the polarity of the field may be reversed, causing the motor to operate in the reverse direction.

Figure 9 is a schematic wiring diagram similar to Figure 8 in which the motor is a three-phase, squirrel-cage, induction motor supplied by current through leads 190, 191 and 192. A reversing switch 193 is indicated as a means to cause leads 191 and 192 in effect to become attached to one or another of the motor connections; thus the sequence of the field excitations may be altered so as to cause the motor to rotate in one or the other direction.

It is to be appreciated that Figures 7, 8, and 9 are meant schematically to indicate the possibility of first, connecting the motor so as to rotate in one or the other direction, and secondly, causing the direction of flux to become accidentally or intentionally reversed after the refrigerating system is installed. It is of course apparent that other types of motors than those indicated can be caused to rotate in more than one direction and it is a feature of my invention that this does not have any effect upon the lubricating system, the compressor pistons being radially attached and the compressor valves being operated in accordance with the differences in pressure on opposite surfaces thereof as more fully explained in my copending application, Serial No. 145,589, filed concurrently herewith, now Patent No. 2,137,965, issued November 22, 1938. It is also apparent that such a reversal of direction of rotation does not affect the compression of the refrigerating gas nor the action of the refrigerating equipment to which the compressing unit is attached.

A portion of the apparatus not herein fully illustrated comprises an unloading valve (not shown) seated in a boss 121 cast in the shell 40 with which bore 49 communicates through a cross-bore 120. Cross-bore 120 also communicates with an oil pressure relief valve (not shown). Details of the pressure relief mechanism and the loading and unloading mechanism are fully set forth in my copending application, Serial No. 145,587, filed concurrently herewith.

Having illustrated and described a preferred embodiment of my invention it should now be apparent to those skilled in the art that modifications in arrangement and detail thereof may be devised within the scope of the appended claim, which claim is to be taken as embracing all such modifications as come within the terms thereof.

I claim:

The combination with a motor-compressor assembly capable of operating in either direction of rotation, of a pump for circulating a lubricating and cooling medium therethrough comprising a gear having a driving connection with said motor-compressor assembly in order to be driven thereby and rotated in unison therewith, and an automatic reversing mechanism associated with said pump comprising a part frictionally engaged by said gear and an abutment against which said part is held in one position by the frictional engagement of said gear and part when said gear is rotating, said part being capable of moving through an arc of approximately 180° by the frictional engagement of said gear upon reversal of rotation of said motor-compressor assembly whereby said pump may force the lubricating and cooling medium in one direction regardless of the direction of rotation of the motor-compressor assembly, said driving connection comprising means whereby said motor-compressor assembly may reverse through substantially 180° before the reversal of rotation of said gear commences in order that said motor-compressor assembly may achieve considerable speed before said pump commences to operate.

CHARLES R. NEESON.